Dec. 8, 1953  D. E. HENDRICKSON ET AL  2,661,826
CLUTCH
Filed Sept. 24, 1948  2 Sheets—Sheet 2

Inventors:
Donald E. Hendrickson,
Daniel M. Schwartz,
Edwin B. Royle.
By: Stowell & Evans,
ATTORNEYS.

Patented Dec. 8, 1953

2,661,826

UNITED STATES PATENT OFFICE 2,661,826

CLUTCH

Donald E. Hendrickson, Edwin B. Royle, and Daniel M. Schwartz, Salt Lake City, Utah, assignors to The Eimco Corporation, Salt Lake City, Utah, a corporation of Utah Application December 24, 1948, Serial No. 67,172

16 Claims. (Cl. 192—93)

This invention relates to clutches and more particularly to mechanically operated friction clutches for transmitting power from a driving member to a driven member.

An object of the invention is to provide a clutch having improved means for adjusting the clutch actuating parts to compensate for wear, particularly wear in the friction elements of the clutch.

Another object is to provide a clutch having a positively acting and reliable actuating mechanism.

Another object is to provide a clutch including a presser plate having a springy or resilient section providing automatic compensation for plate wear within limited ranges.

Another object is to provide a clutch wherein thrust is applied to the presser plate through a universal bearing insuring uniform application of actuating force to the friction elements of the clutch.

A further object is to provide in a clutch of this type adjustable means for applying pressure to the clutch elements through a presser plate including resilient means for returning the presser plate to normal position.

These and other objects and advantages, as will appear as the description proceeds, are achieved in a clutch including a rotary driving member, a rotary driven member coaxially positioned with respect to said driving member, and complementary clutch elements carried by said driving and driven members engageable and disengageable in the axial direction, a reaction plate mounted on one of said rotary members and adjustably positioned thereon, a presser plate, means mounting said presser plate on said reaction plate for axial movement to actuate said complementary clutch elements, clutch actuating means acting between said reaction plate and said presser plate to move said presser plate axially from normal position to a clutch-actuating position and resilient means urging said presser plate axially towards said normal position.

In the drawing, in which like reference numerals designate corresponding parts in the several views, Fig. 1 is an axial sectional view of a clutch in accordance with the invention;

Figure 1:
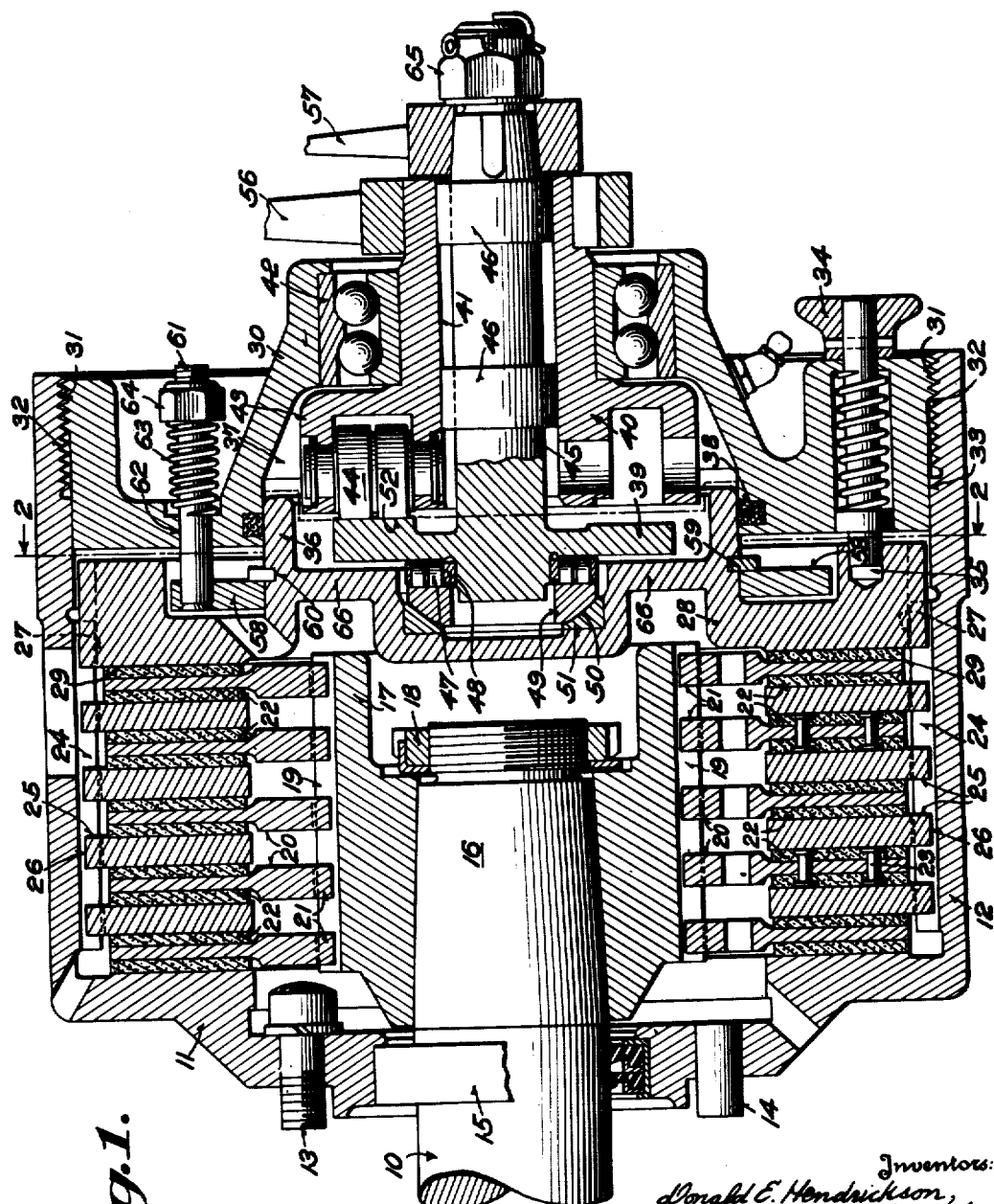

Referring now to the drawing, the clutch shown has a driving shaft 10, conventionally journalled in bearings (not shown) at the left. Surrounding the right hand end of the shaft 10 is a drum 11 having a cylindrical drum face 12 coaxial with the shaft. The drum may be journalled on the shaft 10 by a conventional bearing (not shown) that is secured to the drum by cap screws 13 and dowel 14. A grease seal 15 is included between the drum 11 and the shaft 10.

The end of shaft 10 is tapered at 16 and mounts a hub 17 that is retained on the shaft by a nut 18 threaded to the end of the shaft. The hub may be keyed to the shaft in the usual way. Circumferentially disposed about the periphery of the hub are a plurality of longitudinal splines 19 supporting the driving clutch plates 20 that are notched at 21 to fit over the splines of the hub. It will be seen that the clutch plates 20 are free to slide longitudinally of the hub and are constrained by the spline-notch connection to rotate with the hub. Clutch lining rings 22 are fastened to the faces of the clutch plates by rivets 23.

The interior of the drum is also provided with circumferentially spaced inwardly projecting splines 24 that carry a plurality of driven clutch plates 25 interspaced between the driving clutch plates 20 in the usual complementary arrangement. The driven plates are notched at 26 so that they may be moved axially of the drum but cannot rotate with respect thereto.

Also mounted on the drum splines 24 by notched connections 27 is a presser plate 28. This plate has a peripheral annular zone 29 that bears against the right hand end of the stacked arrangement of clutch plates for exerting clutch engaging pressure thereon. By virtue of the notched connections 27, the presser plate rotates with the drum yet is free for axial movement therein.

Adjacent the presser plate, and to the right thereof as seen in the Fig. 1, is an adjusting plate or reaction plate 30. The adjusting plate has a peripheral threaded portion 31 engaging corresponding internal threads 32 in the drum 11. At the interface 33 between the drum 11 and the adjusting plate, a close machined fit is provided to pilot the plate in the drum; by this expedient, the threads 31—32 may fit loosely to permit easy turning of the reaction plate in the drum while insuring correct alignment of the parts. A spring-pressed locking pin 34 is mounted in the reaction plate and engages any one of a plurality of complementary holes 35 in the presser plate 28 to lock the reaction plate in adjusted position.

As shown in Fig. 1, the presser plate 28 has a flanged portion 36 that extends into a recess in the reaction plate 30 to provide a clutch actuator cavity 37. Grease packing 38 seals the joint between the presser plate and the reaction plate.

Within the cavity 37 is a clutch actuator including a cam plate 39 and cooperating follower assembly designated generally by the reference numeral 40.

The follower assembly has a hollow shaft 41 journalled in a double thrust bearing 42. At the inner or cavity end of the hollow shaft is an integral spider 43 mounting follower rollers 44 on radial axes. There are three sets of rollers 44 carried by the spider on radial axes spaced 120° apart.

The radially extending cam plate 39 is carried by a shaft 45 that passes outwardly from the cavity 37 through the bore of the hollow shaft 41. The cam plate shaft is mounted for rotation in bearings 46 in the bore of the hollow shaft. These bearings permit the cam plate shaft 45 to slide axially therein.

Cam plate 39 bears against the presser plate 28 through a universal thrust bearing device including radially extending roller bearings 47 carried by a cage 48, a torus 49 having a spherical face 50, and a complementary thrust ring 51 carried by the presser plate. It will be seen that movement of the cam plate to the left, as seen in Fig. 1, is transmitted to the presser plate through the roller bearings 47, the torus 49 and the thrust ring 51. The spherical surface 50 permits the presser plate to assume a position delivering circumferentially equalized pressure to the assembly of clutch elements 20—25.

Figure 2:
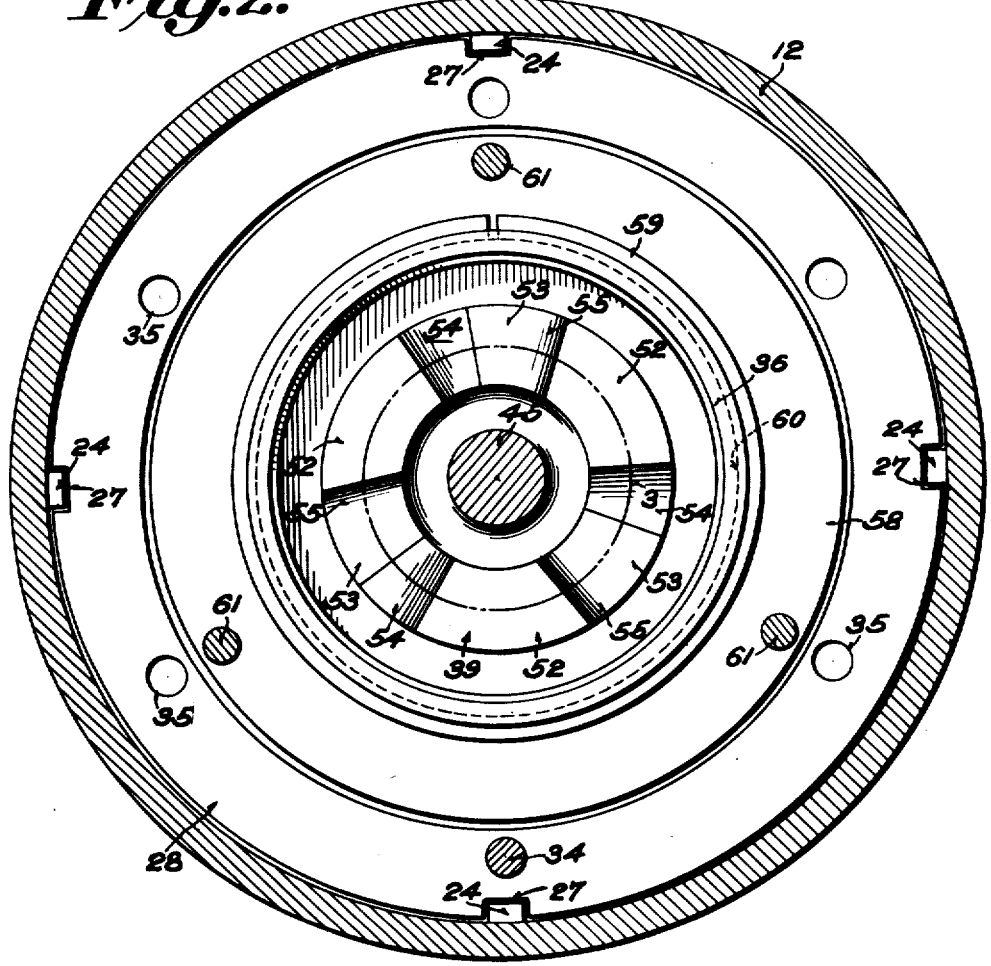
Fig. 2 is a sectional view taken along the plane of the line 2—2 of Fig. 1.
Figure 3:
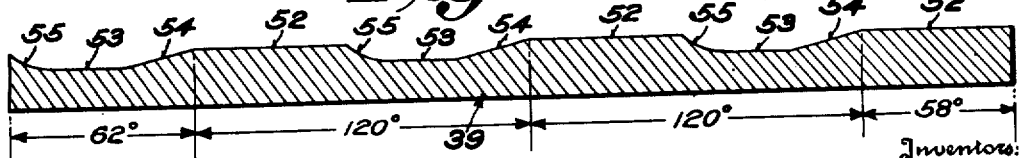
Fig. 3 is a developed sectional view of the cam plate taken along the circle 3 of Fig. 2.

As may be seen in Figs. 2 and 3, the cam plate 39 has three raised lands 52 facing the rollers 44. The lands are spaced 120° apart to correspond to the angular spacing of the rollers. Between the raised lands are depressed areas 53. The connecting areas 54 may be uniformly sloped while the connecting areas 55 may be concavely formed, as best seen in Fig. 3.

It will thus be apparent that relative rotation of the cam plate and follower assembly will cause the rollers to ride across the cam plate surfaces and to force the cam plate to the left, as seen in Fig. 1, or permit it to return to the right. As shown in Fig. 1, the rollers are on the raised lands 52 and the cam plate is in full left hand position. Such relative rotation may be imparted to the clutch actuator parts by levers 56 and 57 attached to the shafts 41 and 45 respectively. Of course, one of the levers may be fixed to a stationary member, and the clutch may be actuated by throwing the movable lever.

The mechanism for returning the presser plate to normal position when the follower rollers 44 are in the depressions of the cam plate includes a slip-ring 58 rotatably retained on the flange 36 of the presser plate by a split retaining ring 59 received in a groove 60 formed in the flange 36. The slip ring carries a plurality of pins or studs 61, specifically shown as three in number, that slidably extend through corresponding holes 62 in the adjusting plate 30. Springs 63 surround the studs and are compressed between the adjusting plate and the lock-nuts 64 threaded on the ends of the pins to urge the pins, the slip-ring, and the presser plate to the right to disengage the clutch.

The slip-ring connection between the presser plate and the spring pressed returning means carried by the adjusting plate permits the adjusting plate to be screwed into or out of the drum while maintaining returning force on the presser plate. It is evident that when the adjusting plate is rotated in the drum, after releasing the lock pin 34, the studs and slip-ring rotate with the adjusting plate while the slip-ring rotates about the presser plate flange 36. In this manner, the presser plate, the adjusting plate and the actuator mechanism included therebetween may be moved longitudinally in the drum to a position in which correct pressure is applied to the clutch elements when the actuator mechanism is fully extended. As the friction discs of the clutch wear down in service, the adjusting plate may be moved inwardly of the drum to compensate for such wear.

Assembly and disassembly of the clutch may be simply and expeditiously performed. As seen in Fig. 1, all of the parts may be removed to the right. The nut 65 is unscrewed for the removal of the lever 57. The lock-pin 34 is released, and the entire sub-assembly including the presser plate, the actuator and the adjusting plate may be unscrewed and removed from the drum. This sub-assembly may be dismantled by removing the lock-nuts 64 and separating the parts. With this sub-assembly removed from the drum, the clutch elements 20—25 may be withdrawn from their splined supports. The hub 17 may be removed after unscrewing the nut 18. Removal of cap screws 13 will then permit the drum itself to be drawn to the right off the shaft 10. The parts may be reassembled in the reverse order.

Operation of the clutch should be evident in the light of the foregoing description. In brief, however, it may be pointed out that with the clutch engaged, as shown in Fig. 1, power is transmitted from the driving shaft 10 through the hub 17, and through the clutch elements 20—25 to the drum. The parts that rotate with the drum include the presser plate 28 and the reaction plate 30. It is to be noted particularly that the actuator mechanism including the cam plate, the follower device and their shafts do not rotate with the drum; instead, these parts are relatively stationary. The adjusting plate rotates about the hollow shaft 41 on bearing 42 and the presser plate rotates relatively to the cam plate 39 on roller bearings 47.

When the clutch is disengaged, only the driving shaft 10 and its hub and clutch elements rotate. The remaining parts of the structure are stationary.

It is also to be noted that the presser plate has a relatively thin annular zone 66 between the universal thrust bearing and the annular zone 29 wherefrom pressure is applied to the clutch elements. Such thin zone is relatively resilient and permits the presser plate to bend somewhat when the clutch is engaged, thus applying a resilient pressure to the clutch elements. Small amounts of wear in the clutch discs is automatically compensated by the resiliency of the presser plate. Larger amounts of wear are corrected by adjusting the reaction plate, as explained hereinbefore.

Referring to the clutch actuating mechanism, the cam rise 54 preferably has a uniform slope making sharp angles with the lands 52 and depressed areas 53. Thus, a uniform mechanical advantage between the operating levers 56 and 57 and the presser plate 28 is obtained. By this means, the operator is able to accurately judge by feel the status of adjustment of the clutch and to make changes in the adjustment when necessary. Moreover, this uniform mechanical advantage limits the thrust which can be applied to the presser plate so that the clutch is not overloaded by reasonable application of force to the operating levers.

It will be seen from Fig. 3 that the raised lands 52 subtend sectors of 58° on the cam plate 39. With the clutch fully engaged, it will be seen that the follower assembly may be rotated with respect to the cam plate through an angle of 58° without affecting the degree of engagement of the clutch. This is of advantage where two clutches are to be operated from the same lever; then, one clutch can be disengaged without disengaging the other.

An important advantage of the present clutch is that adjustment of the clutch does not affect the positions of the operating levers. Therefore, only a single adjustment need be made and no compensating adjustment of the operating levers is necessary. Moreover, adjustment of the clutch does not affect the setting of the release springs 63.

From the foregoing description it is seen that the present invention provides a compact and efficient clutch having adjusting means that permits long use of the clutch without requiring replacement of the friction elements. Adjustment is quickly accomplished without the use of tools and without requiring the removal of any parts. The clutch elements may be easily removed and replaced when so badly worn as to require such action. The presser plate of the clutch is biased to disengaging position by resilient means coacting with the reaction plate yet not interfering with the adjustability of the latter.

It will be evident that various modifications may be made in the construction of the exemplary clutch herein shown and described without departing from the invention. For example, the presser plate need not be splined to the drum; instead, it may be carried solely by the reaction plate, in which case, the reaction plate is locked in its adjusted position directly to the drum. Such modified form of clutch retains the advantages of the clutch actuating device and plate sub-assembly.

We claim:

1. In a clutch including a rotary driving member, a rotary driven member coaxially positioned with respect to said driving member, and complementary clutch elements carried by said driving and driven members engageable and disengageable in the axial direction, a reaction plate mounted on one of said rotary members and adjustably positioned thereon, a presser plate, means mounting said presser plate on one of said rotary members for axial movement to actuate said complementary clutch elements, clutch actuating means acting between said reaction plate and said presser plate to move said presser plate axially away from said reaction plate to a clutch-actuating position, and resilient means acting between said reaction plate and said presser plate urging said presser plate axially towards said normal position.

2. In a clutch including a rotary driving member, a rotary driven member coaxially positioned with respect to said driving member, and complementary clutch elements carried by said driving and driven members engageable and disengageable in the axial direction, a reaction plate, complementary screw thread means mounting said reaction plate on one of said rotary members for axial adjustment with respect thereto, a presser plate, means mounting said presser plate on one of said rotary members for axial movement to actuate said complementary clutch elements, clutch actuating means acting between said reaction plate and said presser plate to move said presser plate axially away from said reaction plate to a clutch-actuating position, and resilient means acting between said reaction plate and said presser plate urging said presser plate axially towards said normal position.

3. In a clutch including a rotary driving member, a rotary driven member coaxially positioned with respect to said driving member, and complementary clutch elements carried by said driving and driven members engageable and disengageable in the axial direction, a reaction plate, complementary screw thread means mounting said reaction plate on one of said rotary members for axial adjustment with respect thereto, a presser plate, means mounting said presser plate on said one rotary member for rotation therewith and for axial movement therealong, a slip-ring rotatably mounted on one of said plates, means holding said slip-ring for rotation with the other of said plates, clutch actuating means acting between said reaction plate and said presser plate to move said presser plate axially from normal position to a clutch actuating position, and spring means urging said presser plate axially towards said normal position.

4. In a clutch including a rotary driving member, a rotary driven member coaxially positioned with respect to said driving member, and complementary clutch elements carried by said driving and driven members engageable and disengageable in the axial direction, a reaction plate, complementary screw thread means mounting said reaction plate on one of said rotary members for axial adjustment with respect thereto, a presser plate, means mounting said presser plate on said one rotary member for rotation therewith and for axial movement therealong, a slip-ring rotatably mounted on said presser plate, means holding said slip-ring for rotation with said reaction plate, clutch actuating means acting between said reaction plate and said presser plate to move said presser plate axially from normal position to a clutch actuating position, and spring means urging said presser plate axially towards said normal position.

5. In a clutch including a rotary driving member, a rotary driven member coaxially positioned with respect to said driving member, and complementary clutch elements carried by said driving and driven members engagable and disengagable in the axial direction, a reaction plate mounted on one of said rotary members, a presser plate, means mounting said presser plate on one of said rotary members for axial movement to actuate said complementary clutch elements, clutch actuating means including a substantially non-rotating cam and follower device acting between said reaction plate and said presser plate to move said presser plate axially away from said reaction plate to a clutch-actuating position, and resilient means acting between said reaction plate and said presser plate urging said presser plate axially towards said normal position.

6. In a clutch including a rotary driving member, a rotary driven member coaxially positioned with respect to said driving member, and complementary clutch elements carried by said driving and driven members engageable and disengageable in the axial direction, a presser plate, means mounting said presser plate on one of said rotary members for axial movement away from said reaction plate to actuate said complementary clutch elements, clutch actuating means urging said presser plate from normal position to clutch actuating position, and resilient means urging said presser plate axially towards said normal position, said presser plate having a resilient zone between the point at which said clutch actuating means acts thereon and the area from which actuating force is applied to the complementary clutch elements.

7. A clutch as defined in claim 1 having means for locking said reaction plate in adjusted position.

8. A clutch comprising a rotary shaft, a rotary drum coaxially surrounding an end of said shaft, an assembly of complementary friction rings carried by said shaft and said drum engageable and disengageable in the axial direction, a presser plate carried by said drum and mounted for axial movement therealong into and out of engagement with said assembly of friction rings, a reaction plate mounted on said drum adjacent to said presser plate, clutch actuating means acting between said presser plate and said reaction plate to move said presser plate axially into engagement with said assembly of friction rings, means for adjusting the axial position of said reaction plate with respect to said drum including a screw threaded connection mounting said reaction plate on said drum, and means for returning said presser plate to normal position including a slip-ring rotatably mounted on said presser plate and resilient means acting between said slip-ring and said reaction plate.

9. In a clutch including a rotary driving member, a rotary driven member coaxial with said driving member, and complementary clutch elements carried by said driving and driven members engageable and disengageable in the axial direction; a reaction plate mounted on one of said rotary members and adjustably positioned thereon, a presser plate, means mounting said presser plate on one of said rotary members for axial movement to actuate said complementary clutch elements, clutch actuating means to move said presser plate from normal position to a clutch-actuating position, resilient means acting between said reaction plate and said presser plate urging said presser plate towards said normal position, and a slip-ring connection between said resilient means and one of said plates.

10. A clutch as defined in claim 9 wherein said resilient means is mounted between said slip-ring connection and said reaction plate.

11. In a clutch including a rotary driving member, a rotary driven member coaxially positioned with respect to said driving member, and complementary clutch elements carried by said driving and driven members engageable and disengageable in the axial direction, a reaction plate mounted on one of said rotary members, a presser plate, means mounting said presser plate on one of said rotary members for axial movement to actuate said complementary clutch elements, clutch actuating means acting between said reaction plate and said presser plate to move said presser plate axially away from said reaction plate to a clutch-actuating position, said clutch actuating means including a thrust type bearing means acting against said presser plate, and resilient means urging said presser plate axially towards said normal position.

12. In a clutch including a rotary driving member, a rotary driven member coaxially positioned with respect to said driving member, and complementary clutch elements carried by said driving and driven members engageable and disengageable in the axial direction, a reaction plate mounted on one of said rotary members, a presser plate, means mounting said presser plate on one of said rotary members for axial movement to actuate said complementary clutch elements, clutch actuating means including a substantially non-rotating cam and follower device acting between said reaction plate and said presser plate to move said presser plate axially away from said reaction plate from normal position to a clutch-actuating position, said cam and follower device being operable by relative rotation between the cam and follower, and resilient means urging said presser plate axially towards said normal position.

13. In a clutch including a rotary driving member, a rotary driven member coaxially positioned with respect to said driving member, and complementary clutch elements carried by said driving and driven members engageable and disengageable in the axial direction, a reaction plate mounted on one of said rotary members, a presser plate, means mounting said presser plate on one of said rotary members for axial movement to actuate said complementary clutch elements, clutch actuating means acting between said reaction plate and said presser plate to move said presser plate axially from normal position to a clutch-actuating position, said clutch actuating means being journalled in at least one of said rotary members to allow rotation thereof relative to the clutch-actuating means, and resilient means urging said presser plate axially towards said normal position.

14. In a clutch as defined in claim 12, said cam and follower device having a dwell position where relative rotation between the cam and follower maintains the actuating position of the clutch-actuating means.

15. In a clutch as defined in claim 12, said cam and follower device having a dwell position where relative rotation between the cam and follower maintains the disengaged position of the clutch actuating means.

16. In a clutch as defined in claim 12, said cam having rise portions of constant slope.

DONALD E. HENDRICKSON.
EDWIN B. ROYLE.
DANIEL M. SCHWARTZ.

References Cited in the file of this patent

UNITED STATES PATENTS

| Number | Name | Date |
|---|---|---|
| 1,745,079 | Conway | Jan. 28, 1930 |
| 2,077,709 | Pearmain | Apr. 20, 1937 |
| 2,201,567 | Walters | May 21, 1940 |

FOREIGN PATENTS

| Number | Country | Date |
|---|---|---|
| 362,568 | Great Britain | Dec. 10, 1931 |

Certificate of Correction

Patent No. 2,661,826 December 8, 1953

Donald E. Hendrickson et al.

It is hereby certified that error appears in the printed specification of the above numbered patent requiring correction as follows:

Column 8, line 38, after "axially" insert *away from said reaction plate*; and that the said Letters Patent should be read as corrected above, so that the same may conform to the record of the case in the Patent Office.

Signed and sealed this 26th day of January, A. D. 1954.

[SEAL]

ARTHUR W. CROCKER,
*Assistant Commissioner of Patents.*